United States Patent
Bloedorn

[19]

[11] Patent Number: 5,924,381
[45] Date of Patent: Jul. 20, 1999

[54] BIRD FEEDER HAVING REMOVABLE APERTURED METAL FLOOR

[75] Inventor: Dan A. Bloedorn, Chilton, Wis.

[73] Assignee: Backyard Nature Products, Inc., Chilton, Wis.

[21] Appl. No.: 08/944,925

[22] Filed: Oct. 6, 1997

[51] Int. Cl.⁶ .................................................. A01K 39/01
[52] U.S. Cl. ........................ 119/52.2; 119/429; 119/462; 119/463
[58] Field of Search ................... 119/52.2, 52.1, 119/429, 431, 432, 462, 463, 472, 473, 478, 479

[56] References Cited

U.S. PATENT DOCUMENTS

| | | | |
|---|---|---|---|
| D. 299,568 | 1/1989 | Waltemeyer | D30/124 |
| 1,771,492 | 7/1930 | Karlson . | |
| 2,312,551 | 3/1943 | Hoskins . | |
| 2,944,516 | 7/1960 | Malloy, Sr. . | |
| 3,100,474 | 8/1963 | Schneider | 119/462 |
| 3,136,296 | 6/1964 | Luin | 119/52 |
| 3,295,498 | 1/1967 | Brown | 119/429 |
| 4,167,917 | 9/1979 | Noll | 119/429 |
| 4,442,793 | 4/1984 | Overpeck et al. . | |
| 4,802,442 | 2/1989 | Wilson | 119/1 |
| 4,958,595 | 9/1990 | Richman et al. . | |
| 5,033,411 | 7/1991 | Brucker | 119/52.1 |
| 5,063,877 | 11/1991 | Riggi | 119/52.2 |
| 5,078,098 | 1/1992 | Ragen | 119/52.2 |
| 5,320,064 | 6/1994 | Selstad | 119/472 |
| 5,361,725 | 11/1994 | Baillie et al. | 119/165 |
| 5,413,069 | 5/1995 | Currie | 119/52.2 |
| 5,465,683 | 11/1995 | Reisdorf | 119/52.2 |
| 5,479,877 | 1/1996 | Demboske . | |
| 5,531,186 | 7/1996 | Flood et al. | 119/166 |
| 5,775,256 | 7/1998 | Henshaw | 119/57.8 |
| 5,826,539 | 10/1998 | Bloedorn | 119/52.2 |

OTHER PUBLICATIONS

*Metalex* "Manufacturer of Quality Expanded Metal" product brochure, Metalex, a Division of Koller Group (year of publication not provided).
*McNichols Master Catalog*, McNichols Co., 1997.

Primary Examiner—Jack W. Lavinder
Assistant Examiner—Yvonne R. Abbott
Attorney, Agent, or Firm—Nilles & Nilles, S.C.

[57] ABSTRACT

A bird feeder having an apertured floor member which is slidably and selectively removable for easy cleaning. A bird feeder bin is defined by a set of walls, a floor and a roof. When a hinged portion of the roof is opened, at least one section of the walls is slidably removable, and the apertured floor member is also slidably removable. The apertured floor member, which consists of a perforated or expanded steel sheet, provides a combination of sheet material with a pattern of holes which is strong enough to support the weight of the feed, permits drainage to keep the feed dry, and is rugged for scraping and cleaning.

10 Claims, 3 Drawing Sheets

5,924,381

BIRD FEEDER HAVING REMOVABLE APERTURED METAL FLOOR

BACKGROUND OF THE INVENTION

1. Field of the Invention

The present invention relates to a bird feeder, in particular, a bird feeder having an apertured floor member which is selectively removable for easy cleaning.

2. Background of the Related Art

Many different types and designs of bird feeders and bird houses have been developed and are used widely throughout the country. Examples of some of those designs which have been patented include Hoskins, U.S. Pat. No. 2,312,551, Luin, U.S. Pat. No. 3,136,296, Overpeck et al., U.S. Pat. No. 4,442,793, Brucker, U.S. Pat. No. 5,033,411, Riggi, U.S. Pat. No. 5,063,877, Ragen, U.S. Pat. No. 5,078,098, Currie, U.S. Pat. No. 5,413,069, and Demboske, U.S. Pat. No. 5,479,877.

One problem common to many types of bird feeders is the difficulty in cleaning the feeder, especially the bottom or floor of the feeder. After a period of time the seed and feed in the bird feeder will rot, some of the seeds will sprout, and crud will build up and become lodged within certain spaces and crevices in the feeder. Such conditions are naturally detracting to those birds that would otherwise feed on that feeder. Moreover, spoiled feed contributes to the spread of disease. Many diseases are transmitted among birds due to spoiled feed accumulated at the bottom of the feeder, a problem that is exasperated by the feeder not being cleaned on a regular basis.

It is therefore desirable to design a bird feeder which will keep birdseed and feed dry and unspoiled as long as possible, and more importantly, is easy to clean.

SUMMARY OF THE INVENTION

A bird feeder which includes a bird feed bin having an apertured floor member which is selectively removable from the bin for easy cleaning is disclosed. The bird feeder generally comprises a set of walls, roof and floor for defining a bird feed bin. The bird feed bin includes a compartment having an opening for receiving bird feed and an opening for dispensing bird feed. In particular, a hinged portion of the roof may be opened for depositing bird feed into the bin, and closed to cover and protect the feed from the elements. The bird feeder may also be designed so that, when the hinged portion of the roof is opened, certain portions or sections of one or more walls may be slidably removed, which facilitates assembly of the bird feeder, and facilitates cleaning.

As mentioned, the bird feeder is provided with a selectively removable apertured floor member. The apertured floor member is supported on an edge support surface on the inner periphery of a lower portion of the bird feed bin. The apertured floor member preferably consists of a perforated metal sheet or an expanded metal sheet having a pattern of apertures (i.e., holes) across the surface of the sheet. The apertured floor member is further provided with upward turned peripheral edges which enhance the rigidity of the floor member. The apertured floor member is made from a particular material which is strong enough to support the weight of the seed and feed without the need for additional support structures.

The primary object of the invention is to produce a bird feeder that is easier to keep clean than conventional feeders and to do so at a reasonable cost. The apertures (i.e., holes) in the floor member are naturally small enough to contain the bird feed and seed within the hopper or bin, but allow moisture to drain and air to circulate within the feeder in order to keep the seed dry and thereby reducing the occurrence of the seed becoming moldy or to sprout. The apertured floor member, with its upward turned edges, sits within the bottom or the hopper or bin like a tray, which can be selectively removed from and replaced within the bottom of the feeder. The floor member has a relatively smooth surface for easy cleaning. It is also made of a material that can be formed by bending, stamping, molding and the like, which results in a substantial savings in the manufacturing costs and shipping costs for such bird feeders. A sturdy, cost effective, easy-to-clean bird feeder will reduce the incidence of diseases being transmitted through rotten birdseed and lead to a healthier local bird population.

Other objects and advantages of the invention will become apparent from the following description taken in connection with the accompanying drawings which set forth, by way of illustration and example, certain embodiments of the present invention.

BRIEF DESCRIPTION OF THE DRAWINGS

The drawings, which constitute part of the specification and include exemplary embodiments of the present invention, include the following.

DETAILED DESCRIPTION OF THE PREFERRED EMBODIMENTS

Figure 1:
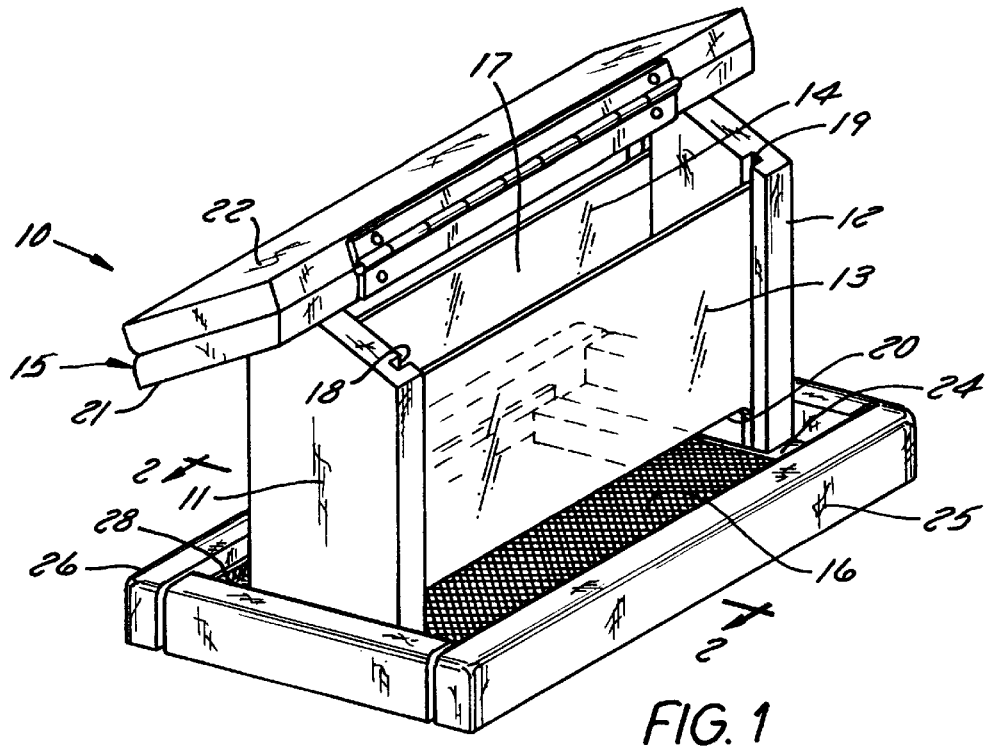
FIG. 1 is a perspective view of a first embodiment of the present invention.
Figure 2:
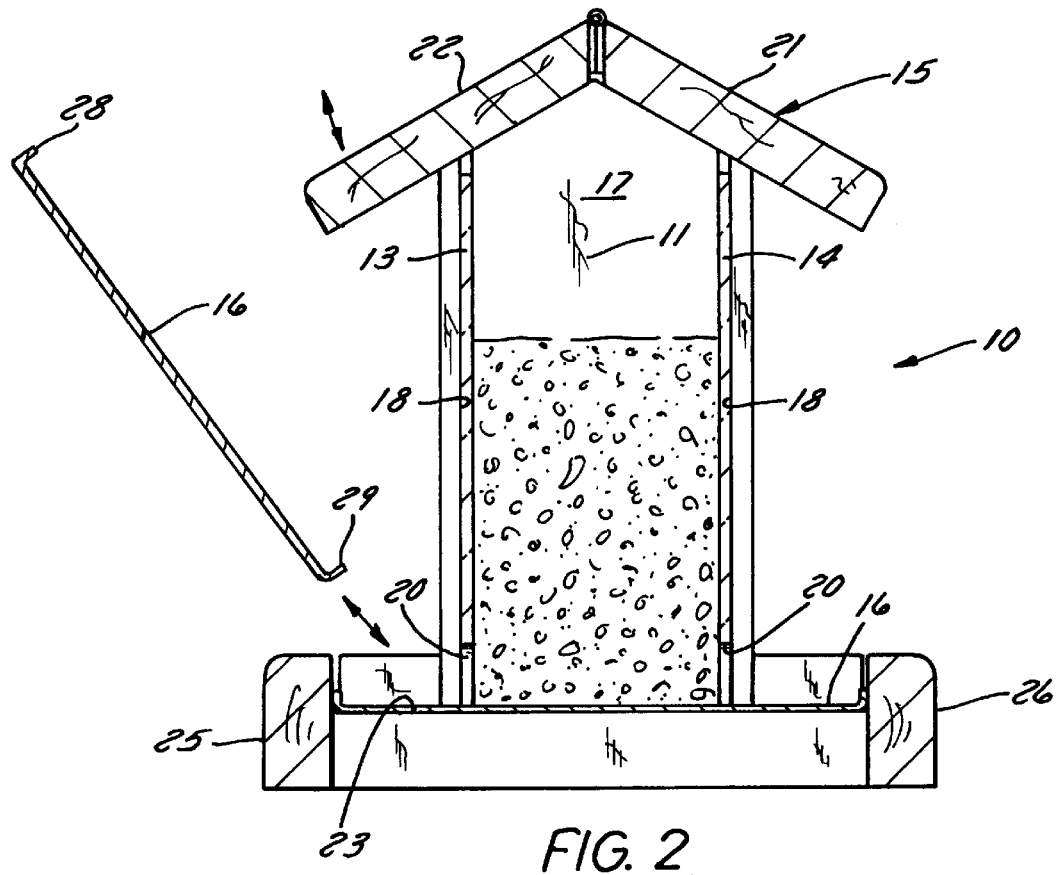
FIG. 2 is a cross-section view of the bird feeder shown in FIG. 1.

With reference to FIGS. 1 and 2, a hopper-type feeder 10 comprises a first wall 11, a second wall 12, a third wall 13, a fourth wall 14, a roof 15 and a floor 16 for defining a bird feed bin 17. The first wall 11 is spaced apart from the second wall 12, and the third wall 13 is spaced apart from the fourth wall 14, in order to form a substantially rectangular box-like hopper. The first and second walls are preferably made of wood or other suitable material.

The third and fourth walls are mounted in a tongue-and-groove-like fashion to the first and second walls. Specifically, the first wall 11 has a first groove 18 near the side edge of the first wall 11, and the second wall 12 has second groove 19 near the side edge of the second wall 12. The third wall is slidably disposed within the first and second grooves in the first and second walls, respectively. Similarly, on the opposite side edges of the feeder, a third groove is provided in the first wall and a fourth groove is provided in the second wall. The fourth wall 14 is slidably disposed within the third groove in the first wall and the fourth groove in the second wall. The third and fourth walls are preferably made of a pane of glass, plastic, plexiglass or other transparent material so the birds can see the seed inside the feeder. The bird feed and seed is dispensed out through an undercut portion 20 of the third and fourth walls adjacent to the floor which provides a passage from the interior of the bird feed bin 17 to an exterior feeding area.

The roof 15 comprises a first portion 21 which is secured, by screws, nails, adhesive or other suitable fastening means, to the upper surface of the first and second walls. The roof 15 further has a second portion 22 which is hinged to the fixed first portion. The hinged portion of the roof is openable to an open position for depositing bird feed into the hopper, and a closed position for covering the hopper. When the hinged portion 22 of the roof is open, at least one plexiglass pane (i.e., the third wall 13) is selectively and slidably removable from the grooves in the first and second walls.

The floor 16 comprises an apertured floor member (discussed further below) which rests on the bottom of the bin. The floor member 16 rests on edge support surfaces on the inner periphery of the lower portion of the bin. Preferably, the floor edge support surfaces comprises at least a first edge support surface 23 on the inner lower portion of the first wall 11, and a second edge support surface 24 on the inner lower portion of the second wall 12. Ordinarily, only two edge support surfaces for supporting the floor are needed, although others may be added if desired. The apertured floor member is contained within the first wall 11, second wall 12, a first transverse brace 25 and a second transverse brace 26.

As mentioned, the floor comprises an apertured floor member 16. As used herein, the term "apertured floor member" means a tray-like member which is made of the material which has a pattern of holes 27 which permit moisture to be drained through the floor of the bird feeder, and yet has sufficient strength to support the weight of the bird feed and seed contained within the hopper without the need of additional structural support members (such as a wood frame of the type commonly used for window screening). The floor is preferably made of a perforated steel sheet, or an expanded steel sheet. Perforated steel sheets are sheets of steel having a pattern of holes which have been punched, pierced or bored into the material. Round holes are the most common, although other decorative design patterns are possible. Expanded metal sheets are sheets of metal which have a pattern of regular diamond-shaped openings joined by continuous uniform strands of material. The material is made by simultaneously slitting and stretching the material to expand it. The apertured floor member preferably has holes in the range of $1/16$ to $1/8$ inches, and bars (i.e., the solid portion of the material between the holes) in the range of about $1/16$ to $1/8$ inches. Consequently, the apertures comprise about 25 to 75 percent of the surface area of the floor of the bird feeder. Suitable perforated or expanded steel sheets are available from, for example, McNichols Company, Tampa, Fla., and Metalex, Libertyville, Ill.

In this context, ordinary window screening and other wire cloth materials are considered not to be within the definition of, and not equivalent to, the apertured floor member, and in particular the perforated metal and expanded metal sheets described herein. Wire screens, mesh or cloth are basically made of interwoven wires. It is simply impractical to make a wire screen, mesh or cloth in which the wires are thick enough for the strength requirements, and also make the spaces (i.e., holes) between the wires small enough to hold the birdseed. Ordinary window screening is too light to have enough strength to serve the function required herein, at least without the use of additional framing or other structural support.

Certain plastics or fiberglass materials might be suitable for use in fabricating an apertured floor member, but the disadvantage in using such materials is that a special mold must be made in order to fabricate the part, which substantially adds to the cost.

The apertured floor member 16 further has at least one upward turned edge for enhancing the rigidity of the floor member. Preferably, the apertured floor member has a first substantially rigid upward turned edge 28 which is formed on one side edge of the floor member, and a second substantially upward turned edge 29 on the opposite edge of the floor member. The upward turned edges are easily and cost effectively manufactured with ordinary metal bending or stamping processes. With reference to the bird feeder disclosed in FIGS. 1 and 2, the first upward turned edge runs parallel to and abuts against the first transverse brace 25 which extends from the first edge support surface 23 on the lower portion of the first wall to the second edge support surface 24 on the inner lower portion of the second wall. Similarly, the second upward turned edge 29 of the floor member runs parallel to and abuts against the second transverse brace 26 which extends from the first edge support surface 23 on the lower portion of the first wall to the second edge support surface 24 on the lower portion of the second wall.

Figure 3:
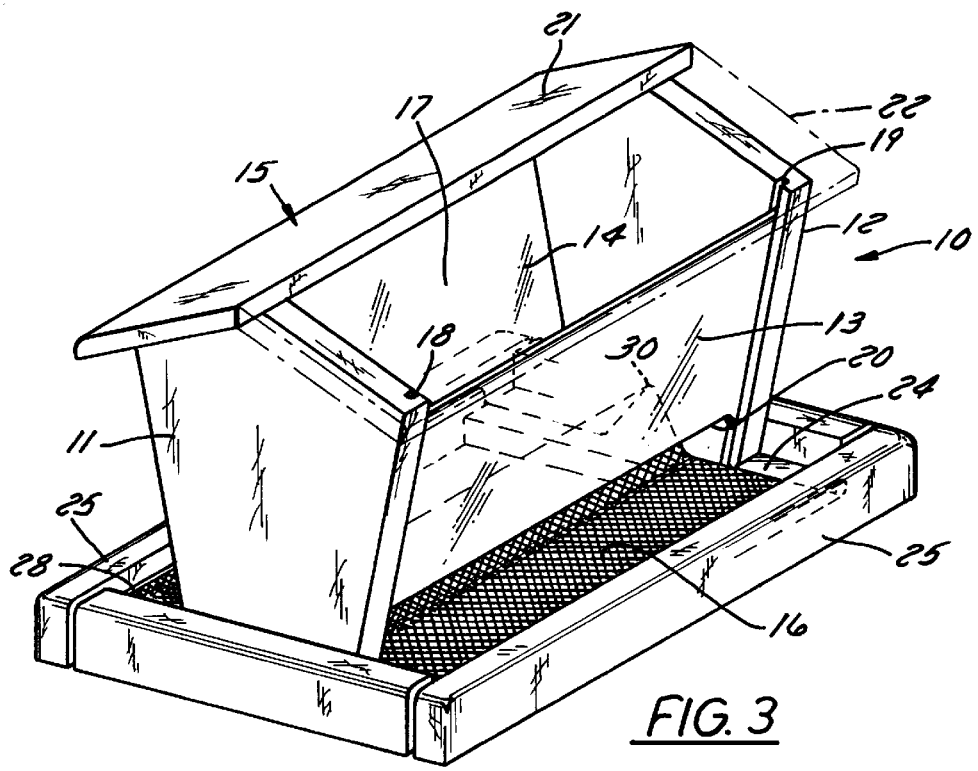
FIG. 3 is a perspective view of a second embodiment of the present invention.
Figure 4:
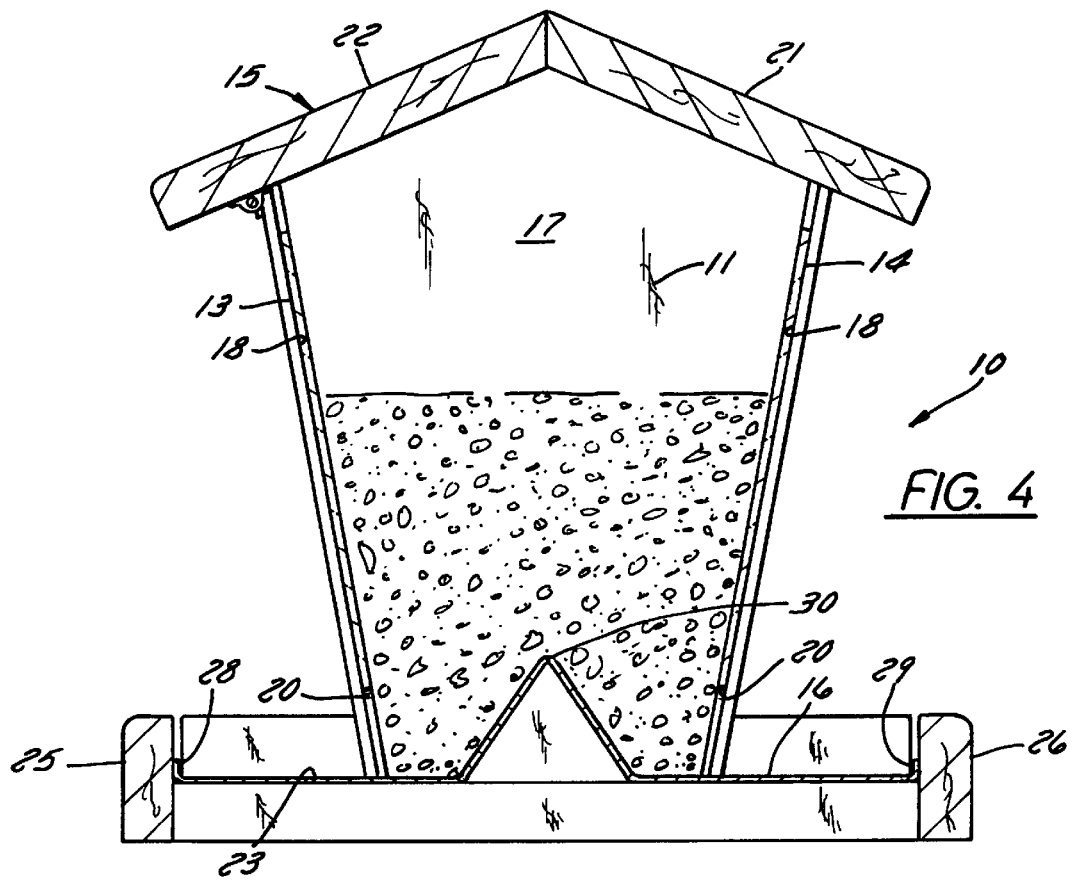
FIG. 4 is a cross-section view of the bird feeder shown in FIG. 3.
Figure 5:
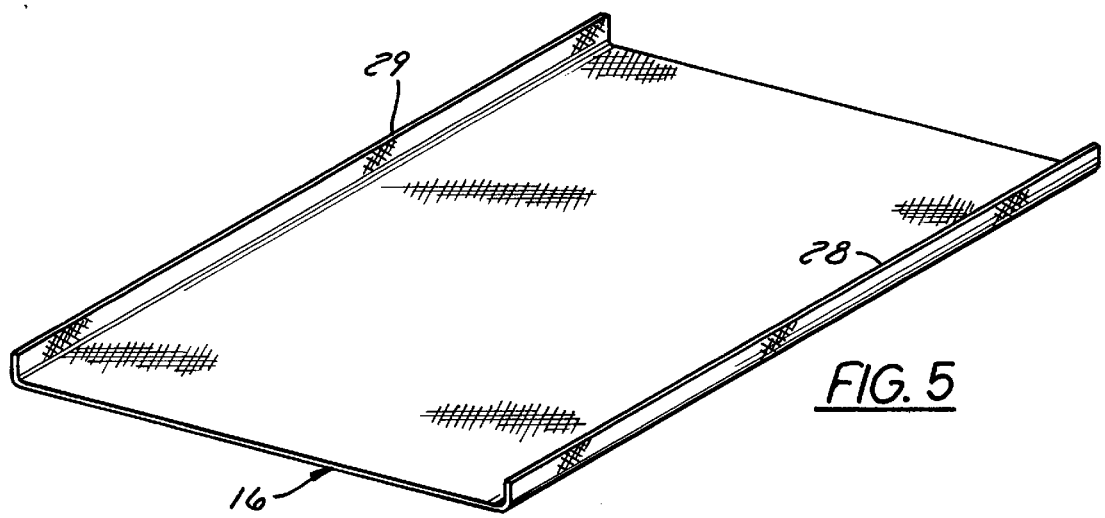
FIG. 5 is a perspective view of the selectively and slidably removable apertured floor member used in the first embodiment of the invention depicted in FIGS. 1 and 2.
Figure 6:
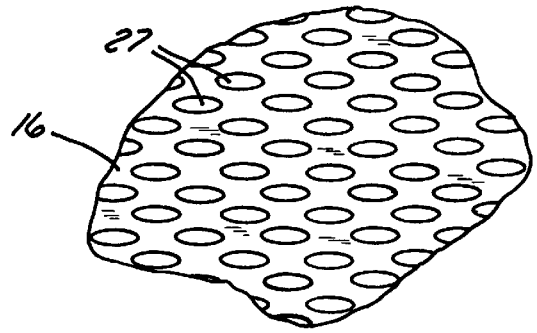
FIG. 6 is a close-up view of apertures in a typical sheet of perforated steel which may be use or forming the apertured floor member.
Figure 7:
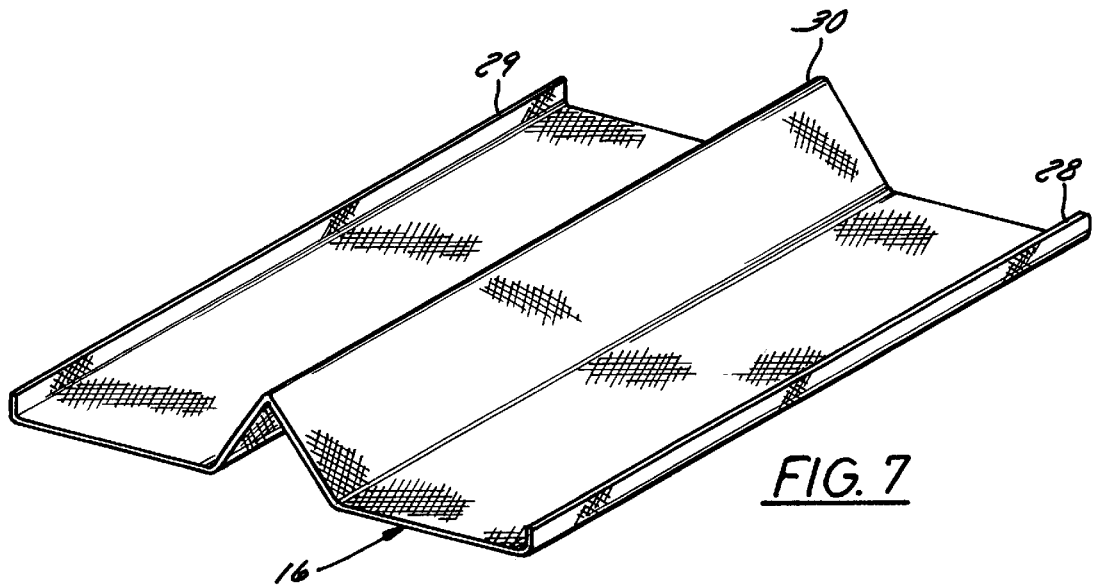
FIG. 7 is a perspective view of an apertured floor member of the type used in the second embodiment of the bird feeder shown in FIGS. 3 and 4.

For larger hopper-type bird feeders, such as that depicted in FIGS. 3 and 4, the floor member further comprises a central raised portion 30, which forces the bird feed outwardly towards the undercut feed dispensing portions in the third and fourth walls so that the birds may reach it and feed upon it. A bent surface, such as that used in the central portion of the floor member in the bird feeder depicted in FIGS. 3 and 4, further adds to the structural rigidity of the floor member.

The apertured metal floor member of the bird feeder is specifically designed so that it is strong enough, by itself and without additional support members, to support the weight of bird feed within the bird feed bin. It has a pattern of holes which permit moisture to drain out of the feeder and to permit air to circulate within it. Most importantly, the floor member is easily removable from the bird feeder so that it may be scraped, hosed or otherwise cleaned by the owner. Specifically, the floor member may be removed by merely opening the hinged portion of the roof, sliding out the plexiglass pane, and lifting out the floor.

Specific structure details disclosed above are not to be interpreted in limiting the scope of the invention, but merely as a basis for the claims and for teaching one skilled in the art to employ the present invention in any appropriately detailed structure. Changes may be made in the specific structural details of that particular embodiment without departing from the spirit of the invention, especially as defined in the following claims.

We claim:

1. A bird feeder comprising:
   a first wall, a second wall, a third wall, a fourth wall, and a roof defining a bird feed bin, said first, second, third and fourth walls further defining an opening in the bottom of said bird feed bin;
   said roof having a hinged portion, said hinged portion having an open position for depositing bird feed into said bird feed bin and a closed position for covering said bird fed bin;
   a first groove in said first wall and a second groove in said second wall;
   said third wall comprising a transparent pane disposed within said first and second grooves in said first and second walls, respectively, and said third wall being slidably and selectively removable from and replaceable into said first and second grooves when the hinged portion of the roof is open;

a first inner floor edge support surface projecting inwardly from an inner periphery of a lower portion of said first wall and a second inner floor edge support surface projecting inwardly from an inner periphery of a lower portion of said second wall; and, a removable floor panel resting on said first and second inner floor edge support surfaces and covering over said opening in the bottom of the bird feed bin, said floor panel consisting of an apertured floor member having a first substantially rigid upward turned edge extending across said opening in the bottom of the bird feed bin from said first inner floor edge support surface to said second inner floor edge support surface, and a second substantially rigid upward turned edge opposite of said first upward turned edge said second substantially rigid upward turned edge also extending across said opening from said first inner floor edge support surface to said second inner floor edge support surface, said apertured floor member being selectively removable from and replaceable onto the edge support surface in said bird feed bin.

2. The bird feeder according to claim 1 further comprising a third groove in said first wall and fourth groove in said second wall;

said fourth wall comprising a second transparent pane disposed in said third and fourth grooves in said first and second walls, respectively.

3. The bird feeder according to claim 2 further comprising undercut portions in the transparent panes adjacent to the floor panel for dispensing said bird feed.

4. The bird feeder according to claim 2 wherein the apertured floor member comprises a central raised portion for dispersing said bird feed towards one or more walls.

5. The bird feeder according to claim 1 wherein the apertured floor member consists of a perforated steel sheet.

6. The bird feeder according to claim 1 wherein the apertured floor member consists of an expanded steel sheet.

7. A bird feeder comprising:

a first wall portion;

a second wall portion opposite said first wall portion;

a third wall portion;

a fourth wall portion opposite said third wall portions;

said first, second, third and fourth wall portions defining a bird feed bin and defining an opening in the bottom of said bin;

a first inner floor support surface on an inner lower portion of said first wall portion;

a second inner floor support surface on an inner lower portion of said second wall portion; and a removable floor panel resting on said first and second inner floor support surfaces and covering over said opening in the bottom of the bird feed bin, said floor panel consisting of a metal sheet member having a pattern of holes therein for draining moisture from and circulating air into said bird feed bin, said metal sheet member having at least one upward turned edge extending across said opening in the bottom of the bird feed bin from said first inner floor support surface to said second inner floor support surface, said floor panel being selectively removable from and replaceable onto said first and second inner floor support surfaces in said bird feed bin.

8. The bird feeder of claim 7, wherein the metal sheet member further comprises a second upward turned edge, opposite said first upward turned edge, also extending from said first inner floor support surface to said second inner floor support surface.

9. The bird feeder of claim 8, wherein the metal sheet member comprises perforated sheet steel.

10. The bird feeder of claim 8, wherein the metal sheet member comprises an expanded.

* * * * *